United States Patent
Liu

(10) Patent No.: US 8,707,007 B2
(45) Date of Patent: Apr. 22, 2014

(54) MEMORY STORAGE DEVICE, MEMORY CONTROLLER THEREOF, AND METHOD FOR AUTOMATICALLY CREATING FILL-FILE THEREOF

(75) Inventor: Sing-Chang Liu, Taipei (TW)

(73) Assignee: Phison Electronics Corp., Miaoli (TW)

( * ) Notice: Subject to any disclaimer, the term of this patent is extended or adjusted under 35 U.S.C. 154(b) by 722 days.

(21) Appl. No.: 12/960,563

(22) Filed: Dec. 6, 2010

(65) Prior Publication Data
US 2012/0089805 A1 Apr. 12, 2012

(30) Foreign Application Priority Data
Oct. 8, 2010 (TW) .............................. 99134409 A

(51) Int. Cl.
*G06F 12/00* (2006.01)
*G06F 13/00* (2006.01)

(52) U.S. Cl.
USPC ............ 711/173; 711/100; 711/154; 711/170

(58) Field of Classification Search
USPC .......................... 711/100, 118, 154, 170, 173
See application file for complete search history.

(56) References Cited

U.S. PATENT DOCUMENTS

| | | | | |
|---|---|---|---|---|
| 6,459,644 | B2 * | 10/2002 | Mizushima et al. | 365/230.01 |
| 7,039,754 | B2 * | 5/2006 | Sasaki | 711/103 |
| 7,398,348 | B2 * | 7/2008 | Moore et al. | 711/103 |
| 7,457,910 | B2 * | 11/2008 | Chang et al. | 711/103 |

* cited by examiner

*Primary Examiner* — Tuan Thai
(74) *Attorney, Agent, or Firm* — Jianq Chyun IP Office

(57) ABSTRACT

A memory storage device, a memory controller thereof, and a method for automatically creating a fill-file thereof are provided. In the present method, a plurality of logical addresses is configured and grouped into a plurality of logical blocks to be mapped to physical blocks of a memory chip in the memory storage device. When a host system is powered on, whether the logical addresses have been formatted into a partition is determined. If the logical addresses have been formatted into a partition, whether a fill-file of a predetermined file capacity exists is determined. If the fill-file does not exist, data related to the fill-file is respectively filled into a file allocation table (FAT) and a root directory of the formatted partition when the host system reads the FAT and the root directory, so as to automatically create the fill-file.

21 Claims, 10 Drawing Sheets

MEMORY STORAGE DEVICE, MEMORY CONTROLLER THEREOF, AND METHOD FOR AUTOMATICALLY CREATING FILL-FILE THEREOF

CROSS-REFERENCE TO RELATED APPLICATION

This application claims the priority benefit of Taiwan application serial no. 99134409, filed on Oct. 8, 2010. The entirety of the above-mentioned patent application is hereby incorporated by reference herein and made a part of this specification.

BACKGROUND OF THE INVENTION

1. Field of the Invention

The present invention generally relates to a method for creating a fill-file, and more particularly, to a method for automatically creating a fill-file, a memory storage device using the same, and a memory controller thereof.

2. Description of Related Art

Regarding a host system (for example, a cell phone or a computer) connected to a storage device, in order to improve the efficiency of the host system on reading data from the storage device, a pre-read mechanism is usually adopted to read part of the data into a random access memory (RAM) of the host system in advance. When subsequently the host system is about to read data from a specific address, if the data at this specific address is already recorded in the RAM of the host system, the host system then directly reads the data from the RAM. In other words, the host system only reads data from the storage device when the data to be read by the host system is not yet recorded in the RAM.

Even though the pre-read mechanism can increase the efficiency in data reading, it may cause the host system not to be able to obtain the latest data in some cases. For example, if the host system reads data from a specific address and records the data into the RAM, and the host system then writes data into the storage device to update the data at the specific address again, when subsequently the host system reads the specific address, because the data at the specific address has been recorded in the RAM, the host system still reads the data from the RAM instead of the storage device. Thus, the host system cannot obtain the updated data.

In order to allow the host system to read the latest data from the storage device, an existing technique usually adopted is to make the host system to write a fill-file into the RAM, so as to make sure that the host system reads data from the storage device. However, it takes a lot of time for the host system to write the fill-file, and when the storage device needs to capture the address range of the fill-file, the host system may determine that the operation of the storage device times out or may even remove or reset the storage device due to the long processing time of the storage device, which brings a lot of inconvenience to the user.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a method for automatically creating a fill-file, wherein the fill-file of a large capacity is instantly and automatically created by a memory storage device according to different file system.

The present invention is directed to a memory controller, wherein a memory storage device having the memory controller can instantly and automatically create a fill-file of a large capacity according to different file system.

The present invention is directed to a memory storage device which can instantly and automatically create a fill-file of a large capacity according to different file system.

The present invention provides a method for automatically creating a fill-file. The method is adaptable to a memory storage device coupled to a host system. The memory storage device includes a memory chip, and the memory chip has a plurality of physical blocks. In the present method, the physical blocks are grouped into at least a data area, a spare area, and a system area. A plurality of logical addresses is configured, and the logical addresses are grouped into a plurality of logical blocks to be mapped to the physical blocks in the data area. When the host system is powered on, if the logical addresses have been formatted into a partition by using a file system and the partition includes a partition boot record (PBR), a file allocation table (FAT), and a root directory, the PBR and the root directory are read, and whether a fill-file of a predetermined file capacity exists in the memory chip is determined. If the fill-file does not exists, when the host system is about to read the FAT, a sector amount corresponding to the predetermined file capacity is configured, a plurality of specific sectors conforming to the sector amount is defined by starting from a predetermined sector of the FAT, a plurality of cluster entry values related to the fill-file is filled into the specific sectors, and the FAT is transmitted to the host system after the logical addresses corresponding to the specific sectors are set to a write-protect status. When the host system is about to read the root directory, a fill-file header of the fill-file is filled into the predetermined sector of the root directory, and the root directory is transmitted to the host system after the logical address corresponding to the predetermined sector of the root directory is set to the write-protect status.

According to an exemplary embodiment of the present invention, the PBR has a free space field, and in the present method, if the fill-file does not exist, when the host system is about to read the PB, a difference between a total capacity of the memory chip and the predetermined file capacity is written into the free space field, and the PBR is transmitted to the host system.

According to an exemplary embodiment of the present invention, the predetermined sector of the FAT is used for storing the cluster entry values of a first quantity, and other sectors of the FAT are respectively used for storing the cluster entry values of a second quantity. The step of configuring the sector amount corresponding to the predetermined file capacity includes configuring a cluster amount for storing the fill-file according to the predetermined file capacity and configuring the sector amount according to the cluster amount, the first quantity, and the second quantity.

According to an exemplary embodiment of the present invention, the step of filling the cluster entry values related to the fill-file into the specific sectors further includes determining whether the specific sectors have a free space after filling the cluster entry values related to the fill-file into the specific sectors, and if the specific sectors have the free space, filling up the free space by using a plurality of cluster entry values related to at least one predetermined file.

According to an exemplary embodiment of the present invention, the predetermined file is one of a hidden file, a deleted file, and a general file.

According to an exemplary embodiment of the present invention, the step of filling the fill-file header into the predetermined sector of the root directory further includes determining whether the predetermined sector of the root directory has a free space after filling the fill-file header into the predetermined sector of the root directory, and if the predetermined sector of the root directory has the free space, filing up the predetermined sector of the root directory by using at least one predetermined file header.

According to an exemplary embodiment of the present invention, the quantity of the predetermined file header is corresponding to a filename format of the fill-file, a filename format of a predetermined file corresponding to the predetermined file header, and a sector capacity.

According to an exemplary embodiment of the present invention, the predetermined sector is the first sector.

According to an exemplary embodiment of the present invention, after the step of reading the PBR and the root directory to determine whether the fill-file exists in the memory chip, the method further includes if the fill-file exists, when the host system is about to read the FAT, setting the logical addresses corresponding to the specific sectors to the write-protect status and transmitting the FAT to the host system, and when the host system is about to read the root directory, setting the logical address corresponding to the predetermined sector of the root directory to the write-protect status and transmitting the root directory to the host system.

According to an exemplary embodiment of the present invention, the method for automatically creating a fill-file further includes following steps. Whether the host system starts to execute a format operation is determined. If the host system starts to execute the format operation, whether the format operation is completed is determined. After the format operation is completed, when the host system is about to read the FAT, the sector amount corresponding to the predetermined file capacity is configured, the specific sectors conforming to the sector amount are defined by starting from the predetermined sector of the FAT, the cluster entry values related to the fill-file is filled into the specific sectors, and the FAT is transmitted to the host system after the logical addresses corresponding to the specific sectors are set to the write-protect status. when the host system is about to read the root directory, the fill-file header of the fill-file is filled into the predetermined sector of the root directory, and the root directory is transmitted to the host system after the logical address corresponding to the predetermined sector of the root directory is set to the write-protect status.

According to an exemplary embodiment of the present invention, the step of determining whether the host system starts to execute the format operation includes when the host system is about to write a writing data into a partition information recording address, determining whether the writing data is the same as an existing data stored in the partition information recording address, and if the writing data is different from the existing data, determining that the host system starts to execute the format operation.

According to an exemplary embodiment of the present invention, the step of determining whether the host system starts to execute the format operation includes when the host system is about to update the content of the PBR, determining whether the host system executes a file modification operation according to data respectively written by the host system into a specific byte address in the PBR before and after the PBR is updated, and if the host system does not execute the file modification operation, determining that the host system starts to execute the format operation.

According to an exemplary embodiment of the present invention, the PBR has a free space field, and the step of determining whether the host system starts to execute the format operation includes when the host system is about to update the content of the PBR, if a free capacity recorded in the free space field is smaller than a difference between a total capacity of the memory chip and the predetermined file capacity, determining that the host system starts to execute the format operation.

According to an exemplary embodiment of the present invention, after the step of determining whether the host system starts to execute the format operation, the method further includes determining whether the FAT and the root directory exist when the host system starts to execute the format operation, and if the FAT and the root directory exist, setting all the logical addresses corresponding to the FAT and the root directory to a writable status.

According to an exemplary embodiment of the present invention, the step of determining whether the format operation is completed includes determining that the format operation is completed when the host system continuously reads two different logical addresses or the logical address read by the host system is different from the logical address previously written by the host system.

According to an exemplary embodiment of the present invention, the method for automatically creating a fill-file further includes following steps. When the host system is powered on, if the logical addresses are not formatted, whether the host system starts to execute a format operation is determined. If the host system starts to execute the format operation, whether the format operation is completed is determined. If the format operation is completed, when the host system is about to read the FAT, the sector amount corresponding to the predetermined file capacity is configured, the specific sectors conforming to the sector amount are defined by starting from the predetermined sector of the FAT, the cluster entry values related to the fill-file is filled into the specific sectors, and the FAT is transmitted to the host system after the logical addresses corresponding to the specific sectors are set to the write-protect status. When the host system is about to read the root directory, the fill-file header of the fill-file is filled into the predetermined sector of the root directory, and the root directory is transmitted to the host system after the logical address corresponding to the predetermined sector of the root directory is set to the write-protect status.

The present invention also provides a memory controller for managing a plurality of physical blocks of a memory chip in a memory storage device. The memory controller includes a host interface, a memory interface, and a memory management circuit. The host interface is used for coupling to a host system, and the memory interface is used for coupling to the memory chip. The memory management circuit is coupled to the host interface and the memory interface. The memory management circuit groups the physical blocks into at least a data area, a spare area, and a system area, configures a plurality of logical addresses, and groups the logical addresses into a plurality of logical blocks to be mapped to the physical blocks in the data area. When the host system is powered on, if the logical addresses have been formatted into at least one partition by using a file system and the partition includes a PBR, a FAT, and a root directory, the memory management circuit further reads the PBR and the root directory to determine whether a fill-file of a predetermined file capacity exists in the memory chip. If the fill-file does not exist, when the host system is about to read the FAT, the memory management circuit configures a sector amount corresponding to the predetermined file capacity, defines a plurality of specific sectors conforming to the sector amount by starting from a predetermined sector of the FAT, fills a plurality of cluster entry values related to the fill-file into the specific sectors, and transmits the FAT to the host system after setting the logical addresses corresponding to the specific sectors to a write-protect status. When the host system is about to read the root directory, the memory management circuit fills a fill-file header of the fill-file into the predetermined sector of the root directory and transmits the root directory to the host system after setting the logical address corresponding to the predetermined sector of the root directory to the write-protect status.

The present invention further provides a memory storage device including a memory chip, a connector, and a memory controller. The memory chip has a plurality of physical blocks. The connector is used for coupling to a host system. The memory controller is coupled to the memory chip and the connector. The memory controller groups the physical blocks into at least a data area, a spare area, and a system area, configures a plurality of logical addresses, and groups the logical addresses into a plurality of logical blocks to be mapped to the physical blocks in the data area. When the host system is powered on, if the logical addresses have been formatted into at least one partition by using a file system and the partition includes a PBR, a FAT, and a root directory, the memory controller reads the PBR and the root directory and determines whether a fill-file of a predetermined file capacity exists in the memory chip. If the fill-file does not exist, when the host system is about to read the FAT, the memory controller configures a sector amount corresponding to the predetermined file capacity, defines a plurality of specific sectors conforming to the sector amount by starting from a predetermined sector of the FAT, fills a plurality of cluster entry values related to the fill-file into the specific sectors, and transmits the FAT to the host system after setting the logical addresses corresponding to the specific sectors to a write-protect status. When the host system is about to read the root directory, the memory controller fills a fill-file header of the fill-file into the predetermined sector of the root directory and transmits the root directory to the host system after setting the logical address corresponding to the predetermined sector of the root directory to the write-protect status.

According to an exemplary embodiment of the present invention, the PBR has a free space field, and if the fill-file does not exist, when the host system is about to read the PBR, the memory controller further writes the difference between the total capacity of the memory chip and the predetermined file capacity into the free space field and transmits the PBR to the host system.

According to an exemplary embodiment of the present invention, the predetermined sector of the FAT is used for storing the cluster entry values of a first quantity, and other sectors of the FAT are respectively used for storing the cluster entry values of a second quantity, and the memory controller further configures a cluster amount for storing the fill-file according to the predetermined file capacity and configures the sector amount according to the cluster amount, the first quantity, and the second quantity.

The present invention still provides a memory storage device including a memory chip, a connector, and a memory controller. The memory chip has a plurality of physical blocks. The connector is used for coupling to the host system. The memory controller is coupled to the memory chip and the connector. The memory controller manages the physical blocks of the memory chip. To be specific, the memory controller groups the physical blocks into at least a data area, a spare area, and a system area, configures a plurality of logical addresses, and groups the logical addresses into a plurality of logical blocks to be mapped to the physical blocks in the data area. When the host system is powered on, the memory controller further configures a corresponding data of a fill-file of a predetermined file capacity to a file system stored in the memory chip and transmits a FAT of the file system to the host system after setting the fill-file to a write-protect status, wherein the fill-file is used for occupying a cache space of the host system so that the host system reads desired data from the memory chip.

As described above, in the present invention, the memory storage device automatically creates a large-capacity fill-file according to different file system used without affecting the operation of the host system, so that the time spent on creating the large-capacity fill-file is reduced. In addition, because the fill-file is created by the memory storage device itself, the memory storage device can instantly obtain the storage address range of the fill-file. Accordingly, the processing speed of the memory storage device is increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
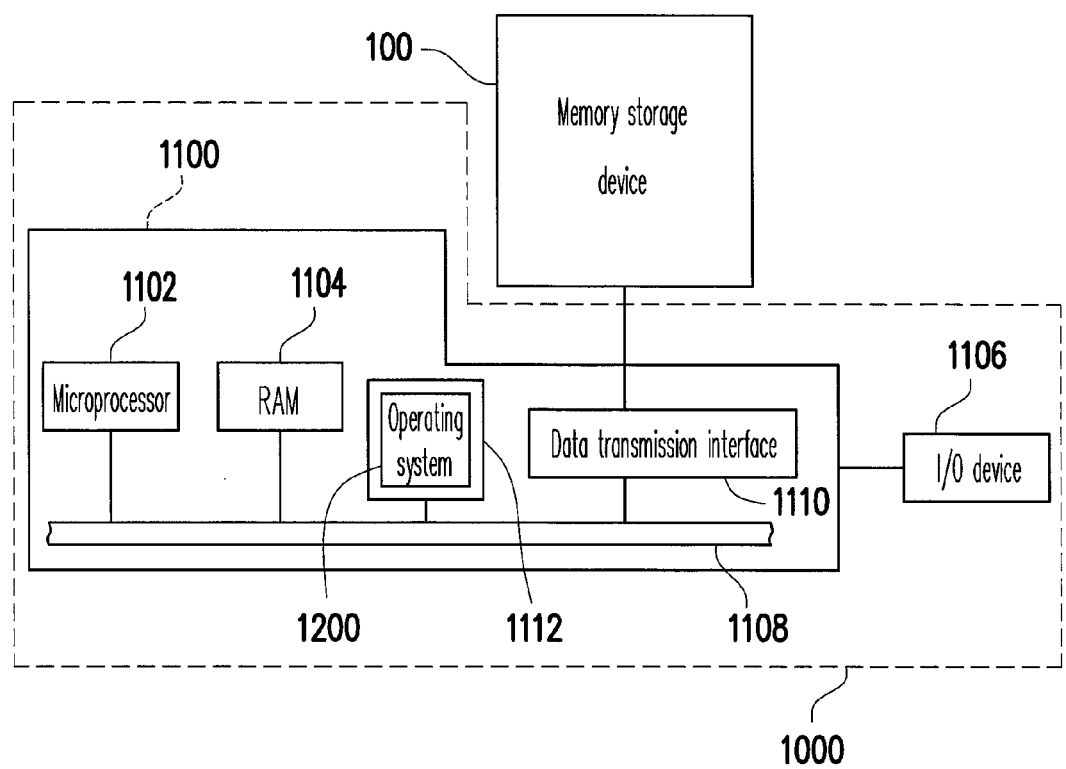
FIG. 1A is a diagram of a host system using a memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1A is a diagram of a host system using a memory storage device according to an exemplary embodiment of the present invention.

Figure 1B:
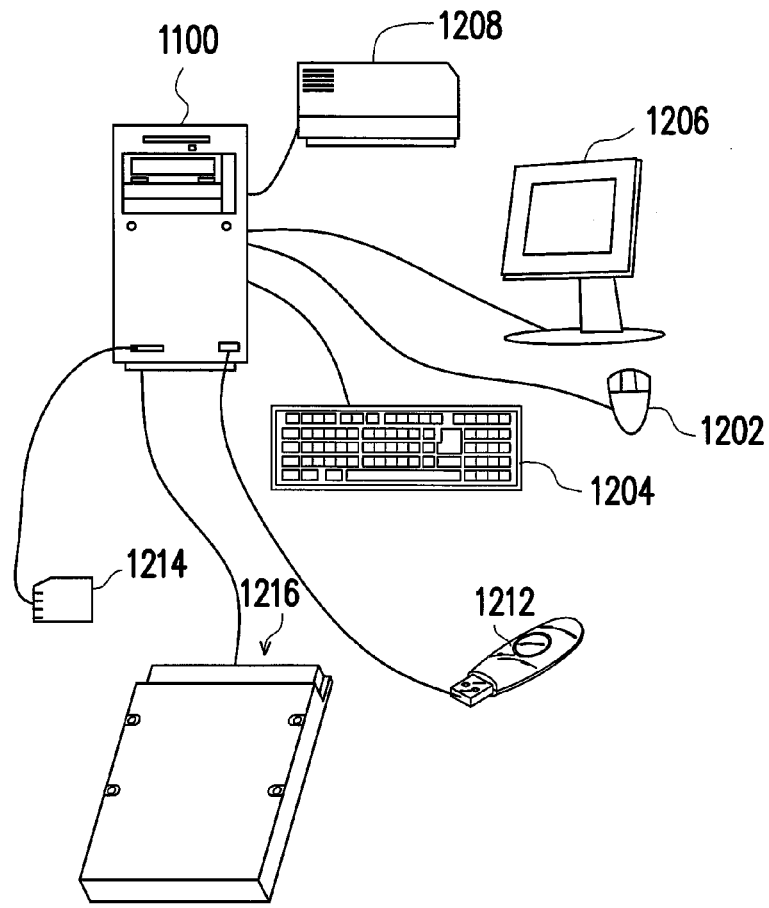
FIG. 1B is a diagram of a computer, an input/output (I/O) device, and a memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108, a data transmission interface 1110, and a primary storage device 1112. The I/O device 1106 includes a mouse 1202, a keyboard 1204, a display 1206, and a printer 1208, as shown in FIG. 1B. It should be understood that the devices illustrated in FIG. 1B are not intended to limit the I/O device 1106, and the I/O device 1106 may further include other devices.

In the present exemplary embodiment, the memory storage device 100 is coupled to other components of the host system 1000 through the data transmission interface 1110. Through the operations of the microprocessor 1102, the RAM 1104, the I/O device 1106, and an operating system (OS) 1200 installed in the primary storage device 1112, the host system 1000 can write data into or read data from the memory storage device 100. For example, the memory storage device 100 may be a memory card 1214, a flash memory 1212, or a solid state drive (SSD) 1216, as shown in FIG. 1B.

Figure 1C:
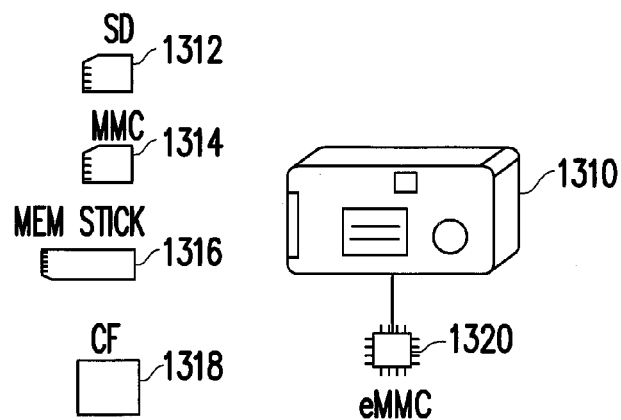
FIG. 1C is a diagram of a host system and a memory storage device according to another exemplary embodiment of the present invention.

Generally speaking, the host system 1000 may be any system that can store data. Even though the host system 1000 is described as a computer system in the present exemplary embodiment, in another exemplary embodiment of the present invention, the host system 1000 may also be a cell phone, a digital camera, a video camera, a communication device, an audio player, or a video player. For example, if the host system is a digital camera 1310, the memory storage device is then a secure digital (SD) card 1312, a multimedia card (MMC) 1314, a memory stick (MS) 1316, a compact flash (CF) card 1318, or an embedded storage device 1320 (as shown in FIG. 1C) used by the digital camera 1310. The embedded storage device 1320 may be an embedded MMC (eMMC) directly coupled to the motherboard of the host system.

Figure 2:
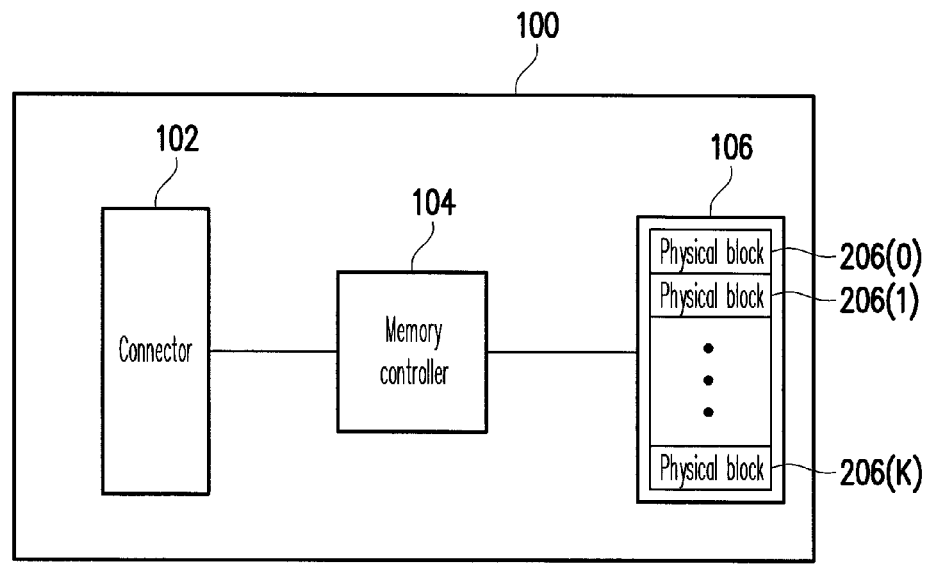
FIG. 2 is a schematic block diagram of the memory storage device in FIG. 1A.

FIG. 2 is a schematic block diagram of the memory storage device 100 in FIG. 1A. Referring to FIG. 2, the memory storage device 100 includes a connector 102, a memory controller 104, and a memory chip 106.

The connector 102 is coupled to the memory controller 104 and used for coupling to the host system 1000. In the present exemplary embodiment, the connector 102 may be a SD interface. However, the present invention is not limited thereto, and in other exemplary embodiments, the connector 102 may also be a MMC interface, a universal serial bus (USB) interface, a serial advanced technology attachment (SATA) interface, a parallel advanced technology attachment (PATA) interface, an Institute of Electrical and Electronic Engineers (IEEE) 1394 interface, a peripheral component interconnect (PCI) express interface, a MS interface, a CF interface, an integrated drive electronics (IDE) interface, or any other suitable interface.

The memory controller 104 executes a plurality of logic gates or control instructions implemented in a hardware form or a firmware form and performs various data operations on the memory chip 106 according to instructions of the host system 1000. In the present exemplary embodiment, in order to increase the efficiency in data accessing, the host system 1000 executes a pre-read mechanism to read data at some addresses of the memory chip 106 into the cache space of the RAM 1104 that is allocated to the pre-read mechanism. In order to prevent the host system 1000 from only reading the cache space of the RAM 1104 therefore not obtaining the latest data in the memory chip 106, the memory controller 104 further executes a fill-file automatic creation procedure to fill up the cache space in the RAM 1104 with a fill-file, so that every time when the host system 1000 reads data from the memory chip 106, it can read the desired data correctly. The fill-file automatic creation procedure executed by the memory controller 104 will be described with reference to accompanying drawings below.

The memory chip 106 is coupled to the memory controller 104. The memory chip 106 stores information related to the file system (for example, a file allocation table (FAT), a partition boot record (PBR), and a root directory) and other general files (for example, text files, video files, or audio files). In the present exemplary embodiment, the memory chip 106 includes a plurality of physical blocks (for example, physical blocks 206(0)-206(K)), wherein each physical block includes a plurality of physical addresses (also referred to as physical pages), and the physical pages corresponding to the same physical block can be written individually but have to be erased all together. To be specific, in the present exemplary embodiment, physical block may be the smallest unit for erasing data. Namely, each physical block contains the least number of memory cells that are erased together. Physical page may be the smallest unit for programming data. Namely, physical page is the smallest unit for writing data.

In the present exemplary embodiment, the memory chip 106 is a rewritable non-volatile memory. For example, the memory chip 106 is a multi level cell (MLC) NAND flash memory chip. However, the present invention is not limited thereto, and the memory chip 106 may also be a single level cell (SLC) NAND flash memory chip, any other flash memory chip, or any memory chip with the same characteristics.

Figure 3:
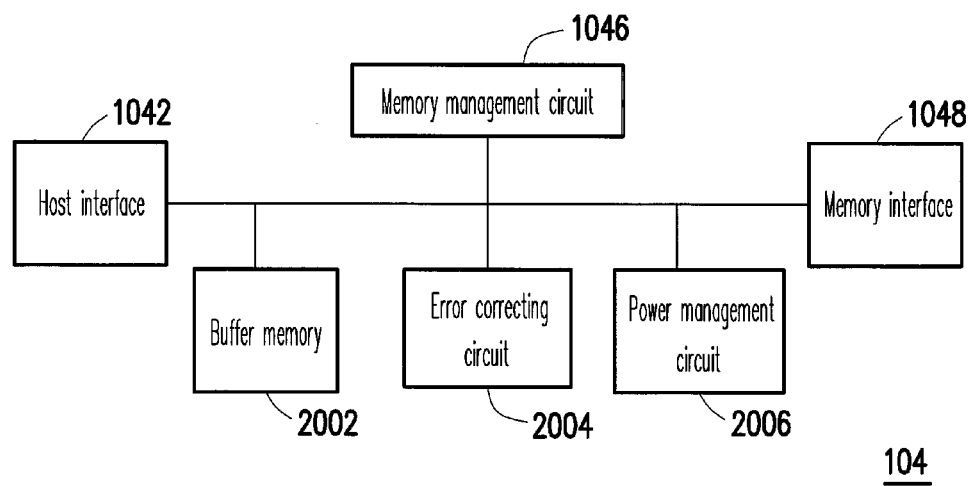
FIG. 3 is a schematic block diagram of a memory controller according to an exemplary embodiment of the present invention.

FIG. 3 is a schematic block diagram of a memory controller according to an exemplary embodiment of the present invention. Referring to FIG. 3, the memory controller 104 includes a host interface 1042, a memory management circuit 1046, and a memory interface 1048.

The host interface 1042 is coupled to the memory management circuit 1046 and to the host system 1000 through the connector 102. The host interface 1042 receives and identifies commands and data from the host system 1000. In other words, commands and data from the host system 1000 are transmitted to the memory management circuit 1046 through the host interface 1042. In the present exemplary embodiment, the host interface 1042 is, corresponding to the connector 102, a SD interface. However, in other exemplary embodiments, the host interface 1042 may also be a MMC interface, a USB interface, a SATA interface, a PATA interface, an IEEE 1394 interface, a PCI express interface, a MS interface, a CF interface, an IDE interface, or any other interface.

The memory management circuit 1046 controls the operation of the memory controller 104. To be specific, the memory management circuit 1046 has a plurality of control instructions. During the operation of the memory storage device 100, the control instructions are executed to accomplish the fill-file automatic creation procedure in the present exemplary embodiment.

In the present exemplary embodiment, the control instructions of the memory management circuit 1046 are implemented in a firmware form. For example, the memory management circuit 1046 has a microprocessor unit (not shown) and a read-only memory (ROM, not shown), and the control instructions are burnt into the ROM. When the memory storage device 100 is in operation, the control instructions are executed by the microprocessor unit to accomplish the fill-file automatic creation procedure in the present exemplary embodiment.

In another exemplary embodiment, the control instructions of the memory management circuit 1046 may also be stored in a specific area of the memory chip 106 (for example, the system area in the memory chip 106 that is exclusively used for storing system data) as program codes. Besides, the memory management circuit 1046 has a microprocessor unit (not shown), a ROM (not shown), and a RAM (not shown). The ROM has a driving code segment, and when the memory controller 104 is enabled, the microprocessor unit first executes this driving code segment to load the control instructions from the memory chip 106 into the RAM of the memory management circuit 1046. After that, the microprocessor unit runs the control instructions to execute the fill-file automatic creation procedure provided by the present exemplary embodiment. Additionally, in another exemplary embodiment of the present invention, the control instructions of the memory management circuit 1046 may also be implemented in a hardware form.

The memory interface 1048 is coupled to the memory management circuit 1046 and used for coupling the memory controller 104 to the memory chip 106 so that the memory controller 104 can perform various operations on the memory chip 106. Namely, data to be written into the memory chip 106 is converted by the memory interface 1048 into a format acceptable to the memory chip 106.

In another exemplary embodiment of the present invention, the memory controller 104 further includes a buffer memory 2002. The buffer memory 2002 is coupled to the memory management circuit 1046 and used for temporarily storing data from the host system 1000 or data from the memory chip 106.

In another exemplary embodiment of the present invention, the memory controller 104 further includes an error correcting circuit 2004. The error correcting circuit 2004 is coupled to the memory management circuit 1046, and which executes an error correcting procedure to ensure data accuracy. To be specific, when the memory controller 104 receives a write command from the host system 1000, the error correcting circuit 2004 generates an error correcting code (ECC) for the data corresponding to the write command, and the data and the corresponding ECC are both written into the memory chip 106. When subsequently the memory controller 104 receives a read command from the host system 1000, it reads the data corresponding to the read command and the corresponding ECC from the memory chip 106. Then, the error correcting circuit 2004 executes the error correcting procedure on the data according to the ECC.

In another exemplary embodiment of the present invention, the memory controller 104 further includes a power management circuit 2006. The power management circuit 2006 is coupled to the memory management circuit 1046, and which controls the power supply of the memory storage device 100.

Figure 4:
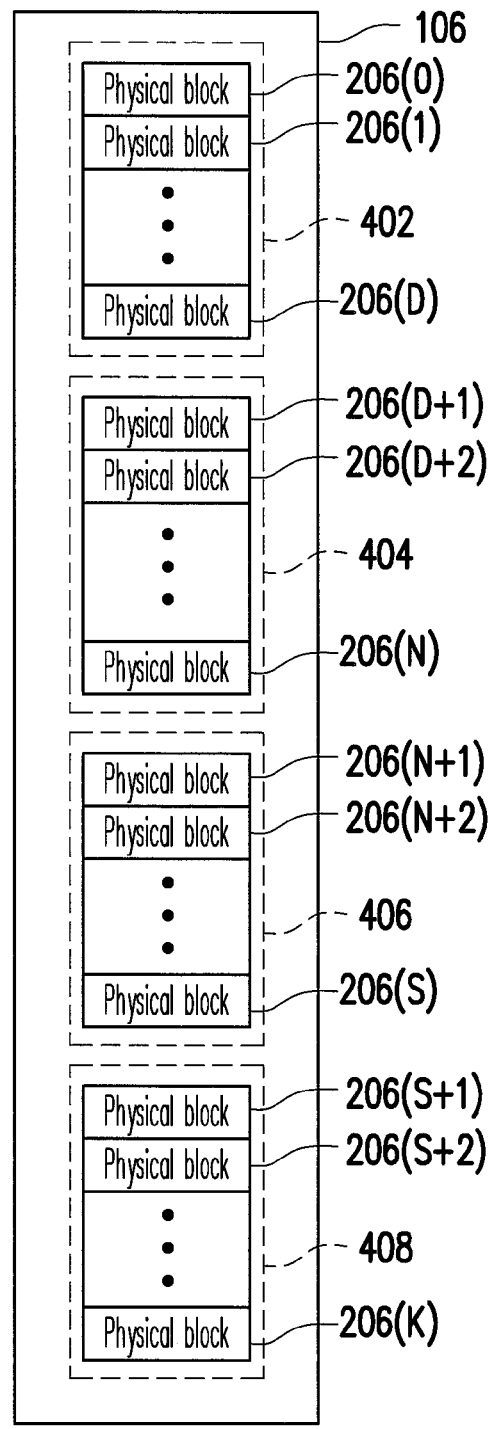
FIG. 4 and FIG. 5 are diagrams illustrating an example of how a memory chip is managed according to an exemplary embodiment of the present invention.
Figure 5:
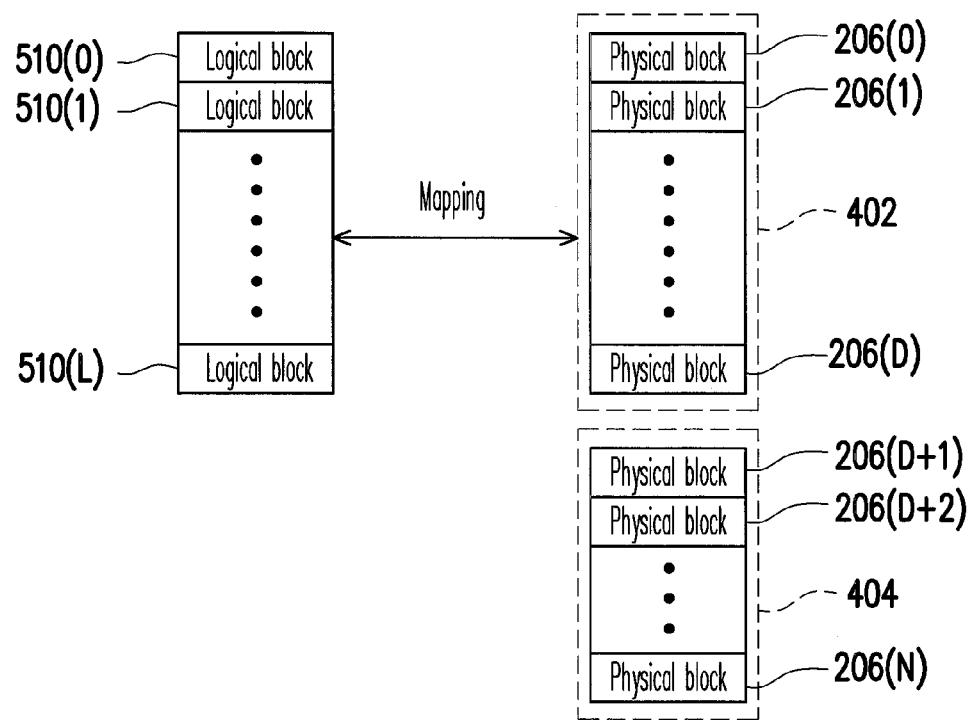

FIG. 4 and FIG. 5 are diagrams illustrating an example of how a memory chip is managed according to an exemplary embodiment of the present invention.

It should be noted that the terms used for describing the operations executed on the physical blocks of the memory chip 106, such as "select", "exchange", "group", and "alternate", only refer to logical operations. Namely, the actual positions of the physical blocks in the memory chip 106 are not changed. Instead, the physical blocks of the memory chip 106 are only logically operated.

Referring to FIG. 4, in the present exemplary embodiment, the memory management circuit 1046 logically groups the physical blocks 206(0)-206(K) in the memory chip 106 into a data area 402, a spare area 404, a system area 406, and a replacement area 408.

The physical blocks logically belonging to the data area 402 and the spare area 404 are used for storing data from the host system 1000. To be specific, the physical blocks in the data area 402 contain data, while the physical blocks in the spare area 404 are used for substituting the physical blocks in the data area 402. Thus, the physical blocks in the spare area 404 are blank or available physical blocks (i.e., no data is recorded therein or data recorded therein is marked as invalid data). Namely, the physical blocks in the spare area 404 have been erased, or when a physical block is selected from the spare area 404 for storing data, the selected physical block is erased before data is stored therein. Thus, the physical blocks in the spare area 404 are available physical blocks.

The physical blocks logically belonging to the system area 406 are used for recording system data, such as the manufacturer and model of the memory chip 106, the number of physical blocks in the memory chip 106, and the number of physical pages in each physical block.

The physical blocks logically belonging to the replacement area 408 are referred to as replacement physical blocks. For example, when the memory chip 106 is manufactured, 4% of its physical blocks are reserved for replacement purpose. When a physical block in the data area 402, the spare area 404, or the system area 406 is damaged, a physical block is selected from the replacement area 408 for replacing the damaged physical block. Accordingly, if a physical block is damaged and there are still normal physical blocks in the replacement area 408, the memory management circuit 1046 selects a normal physical block from the replacement area 408 for replacing the damaged physical block. If a physical block is damaged but there is no more normal physical block in the replacement area 408, the memory management circuit 1046 announces that the memory storage device 100 is in a write-protect status and cannot be used for writing data anymore.

Referring to FIG. 5, as described above, the physical blocks in the data area 402 and the spare area 404 are alternatively used for storing data from the host system 1000. In the present exemplary embodiment, the memory management circuit 1046 configures a plurality of logical blocks. Each of the logical blocks includes a plurality of logical addresses. The memory management circuit 1046 provides the logical addresses to the host system 1000 so that the host system 1000 can access data in the physical blocks that are alternatively used for storing data. To be specific, the memory management circuit 1046 groups the logical addresses provided to the host system 1000 into logical blocks 510(0)-510(L) and maps the logical blocks 510(0)-510(L) to the physical blocks in the data area 402. The memory management circuit 1046 establishes a logical block-physical block mapping table for recording the mapping relationship between the logical blocks and the physical blocks.

However, because different OSs have different file attributes and access rights, the logical addresses in the logical blocks 510(0)-510(L) have to be formatted by using a file system (for example, FAT32 or FAT16) supported by the OS 1200 before they are used by the OS 1200.

Figure 6:
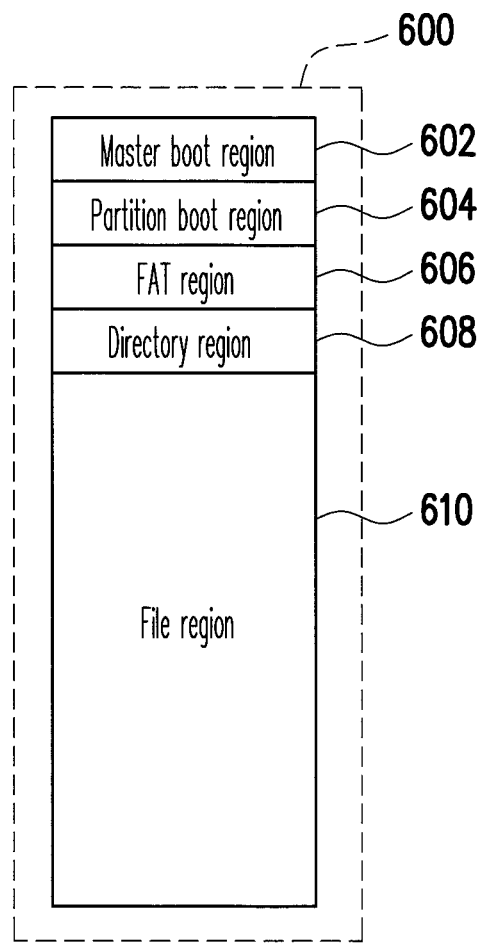
FIG. 6 illustrates an example of formatting logical addresses of a memory chip by using a file system according to an exemplary embodiment of the present invention.

FIG. 6 illustrates an example of formatting logical addresses in a memory chip by using a file system according to an exemplary embodiment of the present invention. As shown in FIG. 6, the host system 1000 formats the logical addresses in the logical blocks 510(0)-510(L) of the memory chip 106 into a partition 600 by using the file system supported by the OS 1200. The partition 600 includes a master boot region 602, a partition boot region 604, a FAT region 606, a directory region 608, and a file region 610.

The storage addresses in the master boot region 602 are used for storing system information of the storage space of the memory storage device 100, such as the master boot record (MBR). The storage addresses in the partition boot region 604 are used for storing the PBR.

The storage addresses in the FAT region 606 are used for storing the FAT. A FAT records the cluster entry value of each of those logical addresses for storing files. In an exemplary embodiment, the FAT region 606 stores two FATs, wherein one of the FATs is regularly accessed while the other FAT is a backup FAT.

The storage addresses in the directory region 608 are used for storing the root directory. The root directory records attribute information of files and directories currently stored in the memory storage device 100. The storage addresses in the file region 610 are used for storing the actual contents of the files.

In the present exemplary embodiment, the master boot region 602, the partition boot region 604, the FAT region 606, and the directory region 608 are accessed in unit of sectors. To be specific, the smallest unit for storing data into a disc is sector, and each sector contains an information content of 512 bytes. However, because the efficiency of the host system 1000 is very low when data is stored therein in unit of sectors, the OS 1200 of the host system 1000 uses cluster as the basic unit for accessing files, wherein the number of sectors in each cluster has to be a power of 2. If it is assumed that 8 continuous sectors constitute a cluster, the capacity of the cluster is then 4096 bytes. In other words, the OS 1200 accesses data in unit of 8 continuous sectors so that the efficiency can be improved It should be noted that even though in the present exemplary embodiment, the host system 1000 formats the logical addresses into one partition 600, in other exemplary embodiments, the host system 1000 may also format the logical addresses into multiple partitions by using a file system.

Every time when the host system 1000 is powered on, the memory management circuit 1046 then determines whether a fill-file of a predetermined file capacity exists in the memory chip 106 after it determines that the logical addresses in the logical blocks 510(0)-510(L) of the memory chip 106 have been formatted. Herein the predetermined file capacity may be 20 to 100 megabytes (MB). However, the present invention is not limited thereto.

If the fill-file does not exist in the memory chip 106, the memory management circuit 1046 creates the fill-file at the same time when the host system 1000 reads information about the file system, such as the PBR, the FAT, and the root directory.

To be specific, after the host system 1000 is powered on and the memory management circuit 1046 determines that the memory chip 106 has been formatted, the memory management circuit 1046 reads the PBR and the root directory of the partition 600 and determines whether a fill-file of the predetermined file capacity exists in the memory chip 106 accordingly.

If the PBR and the root directory indicate that the fill-file does not exist, when the host system 1000 is about to read the FAT, besides reading the FAT from the memory chip 106, the memory management circuit 1046 also configures a sector amount corresponding to the predetermined file capacity and defines several sectors conforming to the sector amount as specific sectors by starting from a predetermined sector of the FAT, and the memory management circuit 1046 further fills a plurality of cluster entry values related to the fill-file into the specific sectors. The memory management circuit 1046 takes the same action regarding the two FATs stored in the FAT region 606.

To be specific, in this exemplary embodiment, when the host system 1000 performs the format operation by using different file systems, different numbers of bytes are required for recording each cluster entry value in the corresponding FAT. For example, 4 bytes are required for recording each cluster entry value in the FAT established by using the FAT32 file system, and 2 bytes are required for recording each cluster entry value in the FAT established by using the FAT16 file system. In the present exemplary embodiment, the predetermined sector may be the first sector of the FAT. Because some bytes in the first sector of the FAT are reserved for recording information related to the FAT (for example, a starting flag of the FAT), the number of cluster entry values that can be stored in the first sector of the FAT is different from the number of cluster entry values that can be stored in other sectors. For example, with the FAT32 file system, the first sector of the FAT can store 125 (i.e., (512−12)/4) cluster entry values, and each other sector can store 128 (i.e., 512/4) cluster entry values. With the FAT16 file system, the first sector of the FAT can store 254 (i.e., (512−4)/2) cluster entry values, and each other sector can store 256 (i.e., 512/2) cluster entry values.

The memory management circuit 1046 configures a cluster amount for storing the fill-file according to the predetermined file capacity and configures the sector amount according to the cluster amount, a first quantity (i.e. the number of cluster entry values that can be stored in the first sector of the FAT), and a second quantity (i.e. the number of cluster entry values that can be stored in each other sector).

In an exemplary embodiment, the memory management circuit 1046 calculates the cluster amount CN for storing the fill-file by using following expression:

$$CN = (X*1024)/Y$$

In foregoing expression, X is the predetermined file capacity (in unit of MB) of the fill-file, and Y is the capacity of one cluster (in unit of kilobytes (KB)). Besides, the memory management circuit 1046 calculates the sector amount SN by using following expression:

$$SN = 1 + \left\lceil \frac{CN - m}{n} \right\rceil$$

In foregoing expression, m is the number of cluster entry values that can be stored in the first sector of the FAT (i.e. the first quantity), and n is the number of cluster entry values that can be stored in each other sector (i.e. the second quantity).

In another exemplary embodiment, the memory management circuit 1046 may directly obtain the sector amount SN from a table recording the mapping relationship between the file capacity and the sector amount according to the predetermined file capacity of the fill-file.

After obtaining the sector amount SN, the memory management circuit 1046 defines those sectors conforming to the sector amount SN as specific sectors by starting from a predetermined sector of the FAT. For example, when the predetermined sector is the first sector of the FAT, the first SN sectors of the FAT are defined as the specific sectors, and when the predetermined sector is the $M^{th}$ sector of the FAT, the $M^{th}$ to the $(M+SN-1)^{th}$ sectors of the FAT are defined as the specific sectors.

Then, the memory management circuit 1046 fills the cluster entry values related to the fill-file by starting from the predetermined sector of the FAT. After all the cluster entry values related to the fill-file are filled into the specific sectors, the memory management circuit 1046 determines whether there is still free space in the specific sectors. If there is still free space in the specific sectors, the memory management circuit 1046 fills up the free space by using a plurality of cluster entry values related to at least one predetermined file, wherein the predetermined file may be a hidden file, a deleted file, or a general file but is not limited thereto.

Figure 7A:
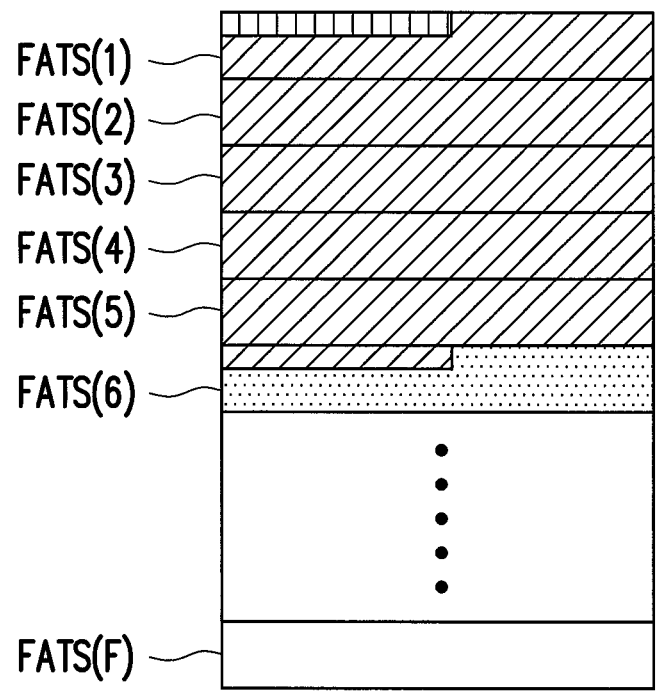
FIG. 7A and FIG. 7B are diagrams illustrating how specific sectors of a FAT are filled up by using cluster entry values related to a fill-file and at least one predetermined file according to an exemplary embodiment of the present invention.

For example, assuming that the host system 1000 performs a format operation to establish the partition 600 by using the FAT32 file system, the capacity of each cluster is 32 KB, and the predetermined file capacity of the fill-file is 20 MB, the memory management circuit 1046 obtains the cluster amount CN for storing the fill-file as 640 and the corresponding sector amount SN as 6 through table lookup or abovementioned expressions. If the predetermined sector is the first sector of the FAT, the first 6 sectors of the FAT are defined as the specific sectors (i.e., the sectors FATS(1)-FATS(6) in FIG. 7A). Because the cluster amount CN corresponding to the fill-file is 640, besides filling information related to the FAT (denoted with straight lines in FIG. 7A) into the first specific sector FATS(1), 125 cluster entry values related to the fill-file (denoted with diagonal lines in FIG. 7A) are filled into the remaining space of the first specific sector FATS(1), 128 cluster entry values related to the fill-file are respectively filled into each of the specific sectors FATS(2)-FATS(5), and the last 3 cluster entry values related to the fill-file are filled into the last specific sector FATS(6). Because the specific sector FATS(6) still has free space, the memory management circuit 1046 fills up the free space by using the cluster entry values related to the predetermined file (denoted with dots in FIG. 7A).

Figure 7B:
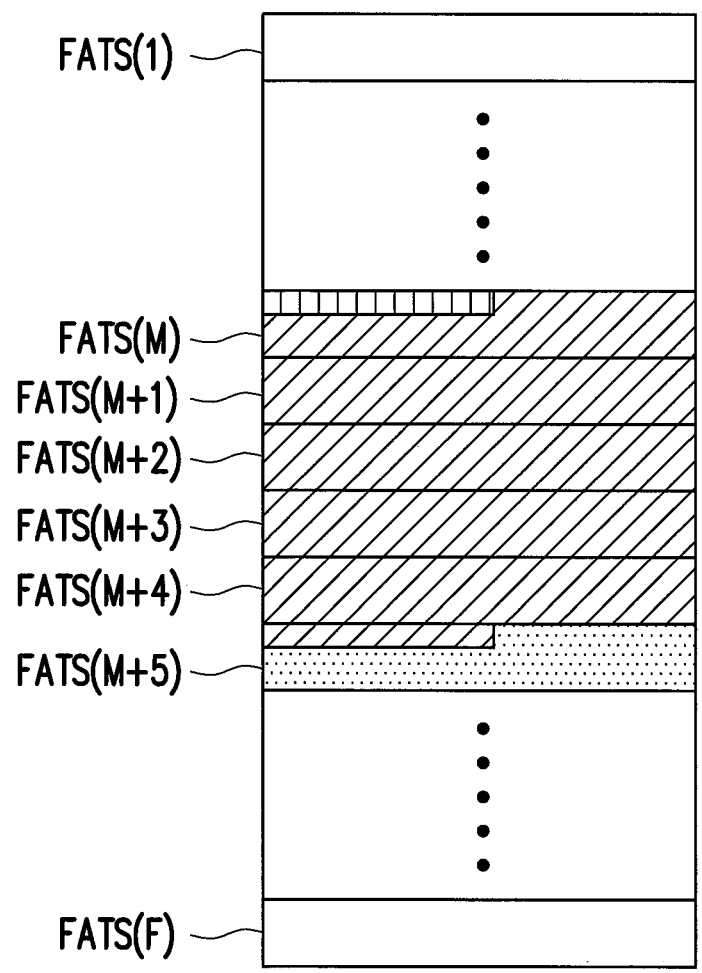

If the predetermined sector is the $M^{th}$ sector of the FAT, as shown in FIG. 7B, the sectors FATS(M)-FATS(M+5) are defined as the specific sectors. Herein identification information (for example, the starting flag of the fill-file, denoted with straight lines in FIG. 7B) and partial cluster entry values related to the fill-file (denoted with diagonal lines in FIG. 7B) are filled into the first specific sector FATS(M), partial cluster entry values related to the fill-file are filled into the specific sectors FATS(M+1)-FATS(M+4), and partial cluster entry values related to the fill-file and the cluster entry values related to the predetermined file (denoted with dots in FIG. 7B) are filled into the last specific sector FATS(M+5).

Because the specific sectors are used for recording the cluster entry values related to the fill-file, the contents recorded in these addresses should be prevented from being deleted or changed by the host system 1000. Thus, the memory management circuit 1046 first sets the logical addresses corresponding to all the specific sectors to a write-protect status and then transmits the FAT to the host system 1000.

When the host system 1000 is about to read the root directory, the memory management circuit 1046 fills a fill-file header of the fill-file into the predetermined sector (for example, the first sector) of the root directory after it reads the root directory from the memory chip 106.

In an exemplary embodiment, if the memory management circuit 1046 determines that there is still free space in the predetermined sector of the root directory after it fills the fill-file header into the predetermined sector of the root directory (i.e., the fill-file header cannot fill up the predetermined sector of the root directory), the memory management circuit 1046 fills up the predetermined sector of the root directory by using at least one predetermined file header, wherein the number of the predetermined file headers is corresponding to the filename format of the fill-file, the filename format of the predetermined file (for example, a hidden file, a deleted file, or a general file) corresponding to each predetermined file header, and the sector capacity.

For example, a file header corresponding to a short filename format takes up a space of 32 bytes in the root directory. Assuming that in the present exemplary embodiment, the predetermined sector is the first sector of the root directory and the filename format of the fill-file is a short filename, because there is still free space in the first sector of the root directory after the memory management circuit 1046 fills the fill-file header into the first sector of the root directory, the memory management circuit 1046 fills up the remaining 480 (i.e., 512−32) bytes in the first sector of the root directory by using 15 predetermined file headers corresponding to a predetermined short filename format (as the first sector RDS(1) of the root directory shown in FIG. 8A) or fills up the remaining 480 bytes in the first sector of the root directory by using one predetermined file header corresponding to a predetermined long filename format (as the first sector RDS(1) of the root directory shown in FIG. 8B). Similarly, if the fill-file has a long filename format, besides filling the fill-file header into the first sector of the root directory, the memory management circuit 1046 also fills up the first sector of the root directory by using a predetermined file header when there is still free space in the first sector of the root directory.

Similarly, in order to prevent the host system 1000 from writing other data into the predetermined sector of the root directory, the memory management circuit 1046 sets the logical addresses corresponding to the predetermined sector of the root directory to a write-protect status and then transmits the root directory to the host system 1000.

It should be noted that the PBR has a free space field if the FAT32 file system is adopted. Thus, if the host system 1000 performs the format operation to construct the partition 600 by using the FAT32 file system and the memory management circuit 1046 determines that the fill-file does not exist, when the host system 1000 is about to read the PBR, the memory management circuit 1046 reads the PBR from the memory chip 106, writes the difference between the total capacity of the memory chip 106 and the predetermined file capacity into the free space field, and then transmits the PBR back to the host system 1000. However, because the PBR does not have aforementioned free space field when the FAT16 file system is adopted, if the host system 1000 construct the partition 600 by using the FAT16 file system, the memory management circuit 1046 directly transmits the PBR back to the host system 1000 after it reads the PBR from the memory chip 106.

In another exemplary embodiment, if the memory management circuit 1046 determines that the logical addresses in the logical blocks 510(0)-510(L) of the memory chip 106 have been formatted and a fill-file of the predetermined file capacity exists in the memory chip 106 when the host system 1000 is powered on, when the host system 1000 is about to read the FAT, the memory management circuit 1046 sets the logical addresses corresponding to the specific sectors in the FAT to the write-protect status and then transmits the FAT to the host system 1000. In addition, when the host system 1000 is about to read the root directory, the memory management circuit 1046 sets the logical addresses corresponding to the predetermined sector of the root directory to the write-protect status and then transmits the root directory to the host system 1000.

In order to use the memory storage device 100, the host system 1000 needs to read information related to the file system of the memory storage device 100 after the host system 1000 is powered on. Thus, when the memory chip 106 has been formatted and the fill-file does not exists, the memory management circuit 1046 fills the information related to the fill-file respectively into the PBR, the FAT, and the root directory at the same time when the host system 1000 respectively reads various file system information. Accordingly, the memory management circuit 1046 can automatically create the fill-file without spending additional execution time, and the memory management circuit 1046 can create the corresponding fill-file regardless of what file system is used for formatting the memory chip 106. Besides, when the memory chip 106 has been formatted and the fill-file exists, the memory management circuit 1046 sets the addresses for storing the fill-file to the write-protect status so that contents stored in these addresses won't be changed by the host system 1000. Because the fill-file is automatically created by the memory management circuit 1046, the memory management circuit 1046 can instantly obtain the storage address range of the fill-file. Due to the same reason, the memory storage device 100 can be synchronized with the host system 1000 after the host system 1000 finishes reading the information of the file system.

In yet another exemplary embodiment, if the memory management circuit 1046 determines that the logical addresses of the memory chip 106 have not been formatted when the host system 1000 is powered on, the memory management circuit 1046 waits for the host system 1000 to finish executing the format operation and then automatically creates the fill-file in the situation that the memory chip 106 has been formatted and the fill-file does not exist.

In other words, the memory management circuit 1046 in the present exemplary embodiment is capable of determining whether the host system 1000 has started to execute the format operation and whether the format operation has been completed. The memory management circuit 1046 may determine whether the host system 1000 has started to execute the format operation through following techniques.

In an exemplary embodiment, a partition information recording address in the memory chip 106 is used for recording data related to a partition. Thus, when the host system 1000 is about to write a writing data into the partition information recording address, the memory management circuit 1046 checks whether the writing data is the same as existing data stored in the partition information recording address. If the writing data is different from the existing data, which means the host system 1000 is about to change the file system, the memory management circuit 1046 determines that the host system 1000 has started to execute the format operation.

In another exemplary embodiment, regardless of whether the data to be written by the host system 1000 is the same as the data originally recorded into the PBR or not, it is determined that the host system 1000 is about to execute the format operation as long as the host system 1000 wants update the content of the PBR. However, because the host system 1000 also updates the PBR when the host system 1000 executes a file modification operation (for example, deletes a file from the memory chip 106 or writes a file into the memory chip 106), the memory management circuit 1046 has to further determine whether an operation of the host system 1000 is the format operation or the file modification operation.

In the present exemplary embodiment, the PBR has a specific byte address, and the memory management circuit 1046 determines whether the host system 1000 executes a file modification operation according to data contents respectively written into the specific byte address before and after the host system 1000 updates the PBR. If the host system 1000 does not execute a file modification operation, the memory management circuit 1046 determines that the host system 1000 is about to execute a format operation.

To be specific, the specific byte address of the PBR varies along with different file system. For example, the specific byte address is 0x25 in the FAT16 file system, and the specific byte address is 0x51 in the FAT32 file system. Taking the FAT16 file system as an example, every time when the host system 1000 is about to execute a file modification operation, it first sets the value at the address 0x25 to 1, and after the host system 1000 finishes executing the file modification operation, it changes the value at the address 0x25 to 0. Thus, the memory management circuit 1046 can determine whether the host system 1000 simply modifies a file or executes a format operation according to the data respectively written into the specific byte address by the host system 1000.

In yet another exemplary embodiment, assuming that the memory chip 106 has been formatted by the host system 1000 by using the FAT32 file system, because the PBR has a free space field in this file system, when the host system 1000 is about to update the content of the PBR, the memory management circuit 1046 determines that the host system 1000 starts to execute a format operation if the free capacity recorded in the free space field is smaller than the difference between the total capacity of the memory chip 106 and the predetermined file capacity.

When the memory management circuit 1046 determines that the host system 1000 is about to execute the format operation, the memory management circuit 1046 checks whether the FAT and the root directory exist. If the FAT and the root directory exist, the memory chip 106 has been formatted. Because the memory management circuit 1046 automatically creates a fill-file, and after creating the fill-file, the memory management circuit 1046 sets some logical addresses in the FAT and the root directory to the write-protect status, in order to allow the format operation to be performed successfully, the memory management circuit 1046 sets all the corresponding logical addresses in the FAT and the root directory to a writable status to allow the host system 1000 to execute the format operation.

When the host system 1000 executes the format operation, it performs data writing, reading, and comparison operations regarding the same address. For example, after the host system 1000 finishes writing the FAT, it reads the FAT again to be compared, so that the memory management circuit 1046 can determine whether the format operation is completed according to such behavior of the host system 1000.

To be specific, when the host system 1000 is about to write data into a logical address, the memory management circuit 1046 records the logical address. When the host system 1000 finishes writing data into the logical address and executes a reading operation, the memory management circuit 1046 determines whether the logical address corresponding to the reading operation is the same as the logical address corresponding to the previous writing operation. If the two are the same, it is determined that the host system 1000 is going to perform a comparison operation and the format operation is not yet completed. Thus, when the host system 1000 continuously reads two different logical addresses or a logical address read by the host system 1000 is different from a previous logical address, the memory management circuit 1046 determines that the format operation is completed.

After the format operation is completed, the memory management circuit 1046 automatically creates a fill-file. The method adopted by the memory management circuit 1046 for creating the fill-file is the same as or similar to the method for creating a fill-file when the memory management circuit 1046 determines that the memory chip 106 has been formatted and no fill-file exists after the host system 1000 is powered on therefore will not be described herein.

Regardless of when the host system 1000 starts to execute the format operation, the memory management circuit 1046 can detect the beginning and ending of the format operation and automatically create a fill-file after the host system 1000 finishes executing the format operation through the technique described above.

In an exemplary embodiment, a user sets the predetermined file capacity of the fill-file by issuing a special instruction. After the host system 1000 re-formats the logical addresses in the logical blocks 510(0)-510(L) of the memory chip 106, the memory management circuit 1046 automatically creates a fill-file conforming to the predetermined file capacity set by the user.

Figure 9:
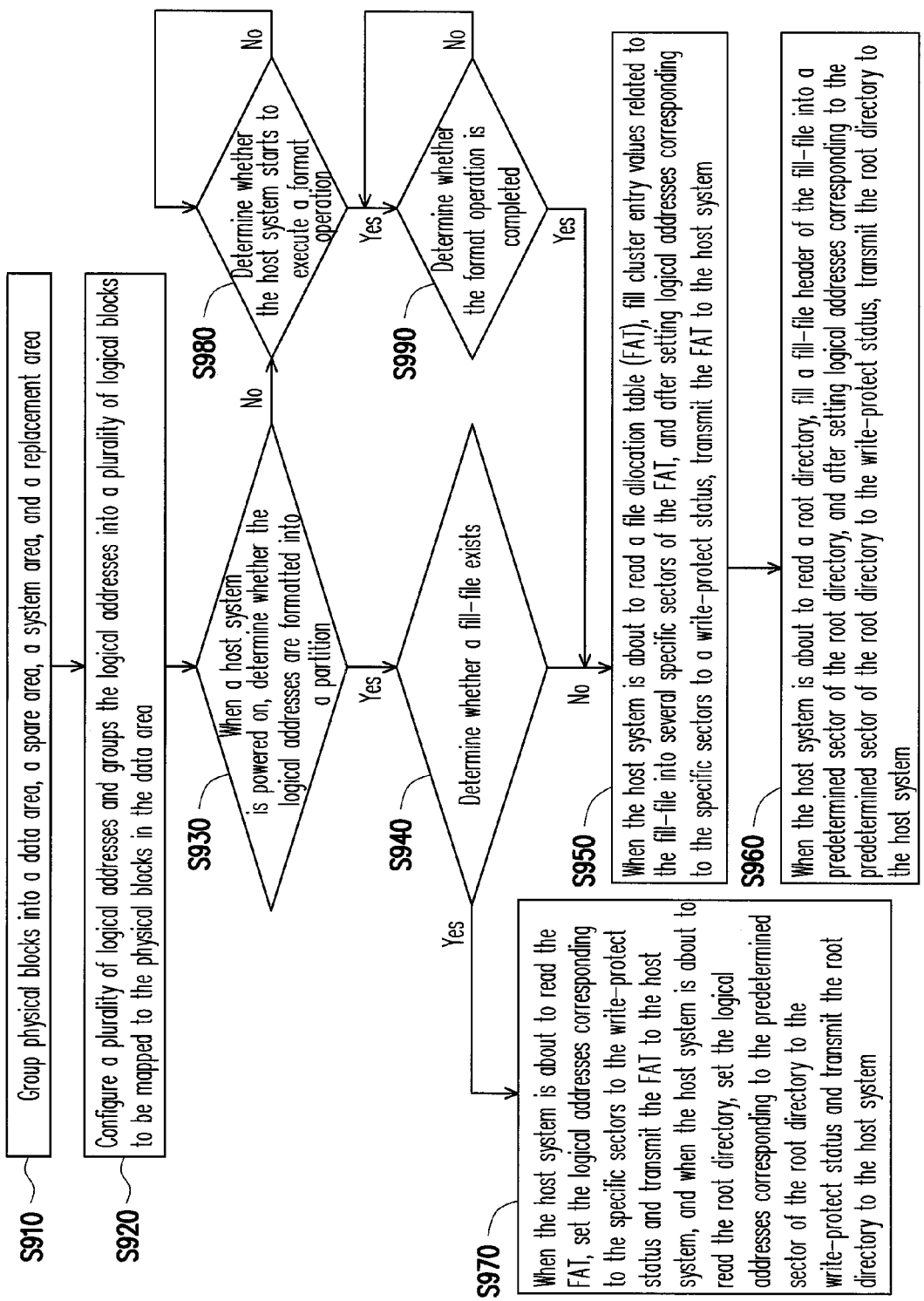
FIG. 9 is a flowchart of a method for automatically creating a fill-file according to an exemplary embodiment of the present invention.

FIG. 9 is a flowchart of a method for automatically creating a fill-file according to an exemplary embodiment of the present invention.

Referring to FIG. 9, in step S910, the memory management circuit 1046 groups the physical blocks 206(0)-206(K) into a data area 402, a spare area 404, a system area 406, and a replacement area 408. In step S920, the memory management circuit 1046 configures a plurality of logical addresses and groups the logical addresses into a plurality of logical blocks 510(0)-510(L) to be mapped to the physical blocks in the data area 402.

In step S930, when the host system 1000 is powered on, the memory management circuit 1046 determines whether the logical addresses are formatted into a partition.

If the logical addresses are formatted into a partition, in step S940, the memory management circuit 1046 reads the PBR and the root directory in the partition to determine whether a fill-file of the predetermined file capacity exists.

If the fill-file does not exists, in step S950, when the host system 1000 is about to read the FAT, the memory management circuit 1046 fills a plurality of cluster entry values related to the fill-file into several specific sectors of the FAT. If the cluster entry values related to the fill-file cannot fill up the specific sectors, the memory management circuit 1046 fills up the specific sectors by using a plurality of cluster entry values of at least one predetermined file (as shown in FIG. 7). After setting the logical addresses corresponding to the specific sectors to a write-protect status, the memory management circuit 1046 transmits the FAT to the host system 1000.

Figure 8A:
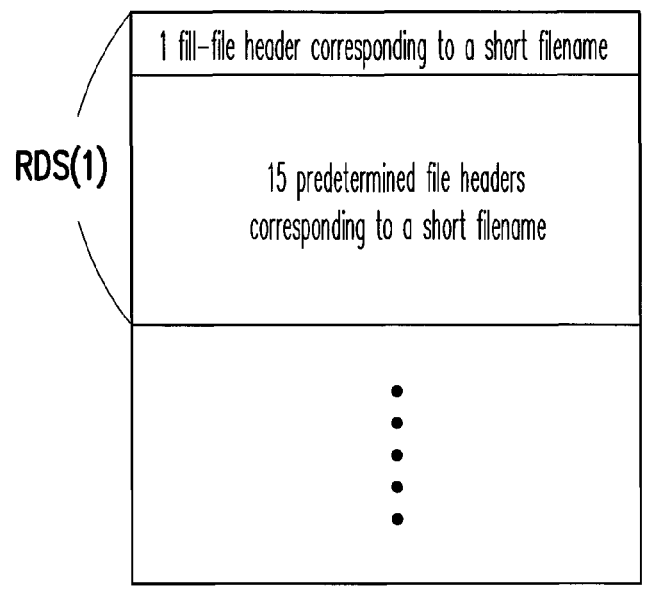
FIG. 8A and FIG. 8B are diagrams illustrating how the first sector of a root directory is filled up by using a fill-file header of a fill-file and at least one predetermined file header according to an exemplary embodiment of the present invention.
Figure 8B:
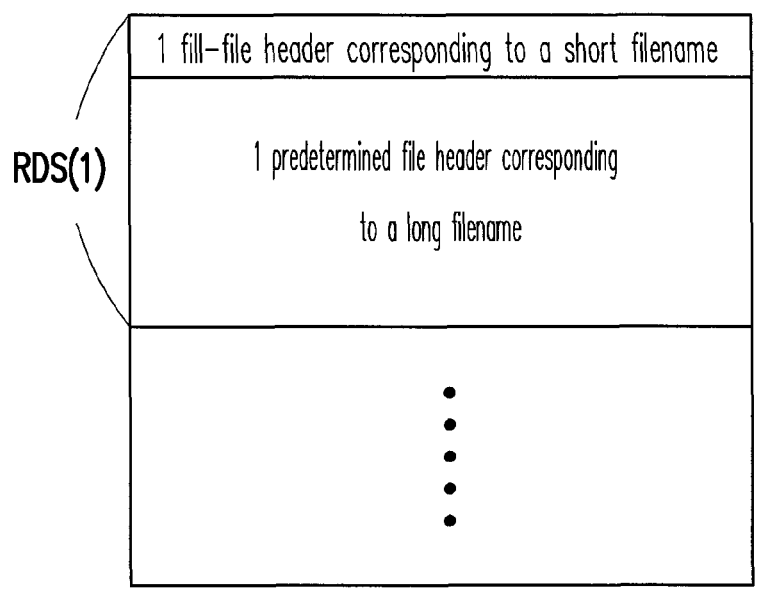

In step S960, when the host system 1000 is about to read the root directory, the memory management circuit 1046 fills a fill-file header of the fill-file into a predetermined sector of the root directory. When the fill-file header of the fill-file cannot fill up the predetermined sector of the root directory, the memory management circuit 1046 fills up the predetermined sector of the root directory by using at least one predetermined file header (as shown in FIG. 8A and FIG. 8B). After setting the logical addresses corresponding to the predetermined sector of the root directory to the write-protect status, the memory management circuit 1046 transmits the root directory to the host system 1000.

On the other hand, if the memory management circuit 1046 determines that the fill-file exists, in step S970, when the host system 1000 is about to read the FAT, the memory management circuit 1046 sets the logical addresses corresponding to the specific sectors to the write-protect status and transmits the FAT to the host system 1000. Besides, when the host system 1000 is about to read the root directory, the memory management circuit 1046 sets the logical addresses corresponding to the predetermined sector of the root directory to the write-protect status and then transmits the root directory to the host system 1000.

If in step S930 the memory management circuit 1046 determines that the logical addresses have not been formatted, in step S980, the memory management circuit 1046 constantly determines whether the host system 1000 starts to execute a format operation. If the memory management circuit 1046 determines that the host system 1000 starts to execute the format operation, in step S990, the memory management circuit 1046 constantly determines whether the format operation is completed.

When the memory management circuit 1046 determines that the format operation is completed, in steps S950 and S960, the memory management circuit 1046 fills data related to the fill-file into the FAT and the root directory when the host system 1000 respectively reads the FAT and the root directory.

In an exemplary embodiment of the present invention, when the host system 1000 is powered on, the memory controller 104 configures the data corresponding to the fill-file of the predetermined file capacity into the file system stored in the memory chip 106, and after setting the fill-file to the write-protect status, the memory controller 104 transmits the FAT of the file system to the host system 1000. To be specific, the memory controller 104 first determines whether the fill-file exists in the file system of the memory chip 106. If the fill-file does not exist, the memory controller 104 configures the data corresponding to the fill-file into the file system. Because the fill-file is used for taking up a cache space in the host system 1000, it is ensured that the host system 1000 can read the desired data from the memory chip 106 when it executes a data reading operation.

In summary, the present invention provides a memory storage device, a memory controller thereof, and a method for automatically creating a fill-file, wherein the memory storage device automatically creates a large-capacity fill-file for filling up the cache space in the RAM of a host system without affecting the operation of the host system, so as to ensure that the host system with a pre-read mechanism can read data from the memory storage device every time when the host system executes a reading operation. The previously described exemplary embodiments of the present invention have many advantages, including no additional execution time is consumed since the memory storage device creates the fill-file at the same time when the host system reads information about the file system, and the efficiency of the host system in executing data writing operations is improved since the fill-file is created by the memory storage device itself so that the memory storage device can instantly obtain the storage address range of the fill-file, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically creating a fill-file, for a memory storage device coupled to a host system, wherein the memory storage device comprises a memory chip, and the memory chip has a plurality of physical blocks, the method comprising:

grouping the plurality of physical blocks into at least a data area, a spare area, and a system area;

configuring a plurality of logical addresses and grouping the plurality of logical addresses into a plurality of logical blocks to be mapped to the physical blocks in the data area;

when the host system is powered on, if the plurality of logical addresses have been formatted into at least one partition by using a file system and said at least one partition comprises a partition boot record (PBR), a file allocation table (FAT), and a root directory, reading the PBR and the root directory to determine whether a fill-file of a predetermined file capacity exists in the memory chip;

if the fill-file does not exist, when the host system is about to read the FAT, configuring a sector amount corresponding to the predetermined file capacity, defining a plurality of specific sectors conforming to the sector amount by starting from a predetermined sector of the FAT, filling a plurality of cluster entry values related to the fill-file into the plurality of specific sectors, and transmitting the FAT to the host system after setting the logical addresses corresponding to the plurality of specific sectors to a write-protect status; and when the host system is about to read the root directory, filling a fill-file header of the fill-file into the predetermined sector of the root directory, and transmitting the root directory to the host system after setting the logical address corresponding to the predetermined sector of the root directory to the write-protect status.

2. The method according to claim 1, wherein the PBR has a free space field, and the method further comprises:

if the fill-file does not exist, when the host system is about to read the PBR, writing a difference between a total capacity of the memory chip and the predetermined file capacity into the free space field; and transmitting the PBR to the host system.

3. The method according to claim 1, wherein the predetermined sector of the FAT is used for storing the cluster entry values of a first quantity, and other sectors of the FAT are respectively used for storing the cluster entry values of a second quantity, and the step of configuring the sector amount corresponding to the predetermined file capacity comprises:

configuring a cluster amount for storing the fill-file according to the predetermined file capacity; and configuring the sector amount according to the cluster amount, the first quantity, and the second quantity.

4. The method according to claim 1, wherein the step of filling the cluster entry values related to the fill-file into the plurality of specific sectors further comprises:

after filling the cluster entry values related to the fill-file into the plurality of specific sectors, determining whether the plurality of specific sectors have a free space; and if the plurality of specific sectors have the free space, filling up the free space by using a plurality of cluster entry values related to at least one predetermined file.

5. The method according to claim 4, wherein the predetermined file is one of a hidden file, a deleted file, and a general file.

6. The method according to claim 1, wherein the step of filling the fill-file header into the predetermined sector of the root directory further comprises:

after filling the fill-file header into the predetermined sector of the root directory, determining whether the predetermined sector of the root directory has a free space; and if the predetermined sector of the root directory has the free space, filing up the predetermined sector of the root directory by using at least one predetermined file header.

7. The method according to claim 6, wherein a quantity of the predetermined file header is corresponding to a filename format of the fill-file, a filename format of a predetermined file corresponding to the predetermined file header, and a sector capacity.

8. The method according to claim 1, wherein the predetermined sector is a first sector.

9. The method according to claim 1, wherein after the step of reading the PBR and the root directory to determine whether the fill-file exists in the memory chip, the method further comprises:

if the fill-file exists, when the host system is about to read the FAT, setting the logical addresses corresponding to the plurality of specific sectors to the write-protect status, and transmitting the FAT to the host system; and when the host system is about to read the root directory, setting the logical address corresponding to the predetermined sector of the root directory to the write-protect status, and transmitting the root directory to the host system.

10. The method according to claim 1 further comprising:

determining whether the host system starts to execute a format operation;

if the host system starts to execute the format operation, determining whether the format operation is completed;

after the format operation is completed, when the host system is about to read the FAT, configuring the sector amount corresponding to the predetermined file capacity, defining the plurality of specific sectors conforming to the sector amount by starting from the predetermined sector of the FAT, filling the cluster entry values related to the fill-file into the plurality of specific sectors, and transmitting the FAT to the host system after setting the logical addresses corresponding to the plurality of specific sectors to the write-protect status; and when the host system is about to read the root directory, filling the fill-file header of the fill-file into the predetermined sector of the root directory, and transmitting the root directory to the host system after setting the logical address corresponding to the predetermined sector of the root directory to the write-protect status.

11. The method according to claim 10, wherein the step of determining whether the host system starts to execute the format operation comprises:

when the host system is about to write a writing data into a partition information recording address, determining whether the writing data is the same as an existing data stored in the partition information recording address; and if the writing data is different from the existing data, determining that the host system starts to execute the format operation.

12. The method according to claim 10, wherein the step of determining whether the host system starts to execute the format operation comprises:

when the host system is about to update a content of the PBR, determining whether the host system executes a file modification operation according to data respectively written by the host system into a specific byte address in the PBR before and after the PBR is updated; and if the host system does not execute the file modification operation, determining that the host system starts to execute the format operation.

13. The method according to claim 10, wherein the PBR has a free space field, and the step of determining whether the host system starts to execute the format operation comprises:

when the host system is about to update a content of the PBR, if a free capacity recorded in the free space field is smaller than a difference between a total capacity of the memory chip and the predetermined file capacity, determining that the host system starts to execute the format operation.

14. The method according to claim 10, wherein after the step of determining whether the host system starts to execute the format operation, the method further comprises:

if the host system starts to execute the format operation, determining whether the FAT and the root directory exist; and if the FAT and the root directory exist, setting all the logical addresses corresponding to the FAT and the root directory to a writable status.

15. The method according to claim 10, wherein the step of determining whether the format operation is completed comprises:

when the host system continuously reads two different logical addresses or the logical address read by the host system is different from the logical address previously written by the host system, determining that the format operation is completed.

16. The method according to claim 1 further comprising:

when the host system is powered on, if the plurality of logical addresses are not formatted, determining whether the host system starts to execute a format operation;

if the host system starts to execute the format operation, determining whether the format operation is completed;

if the format operation is completed, when the host system is about to read the FAT, configuring the sector amount corresponding to the predetermined file capacity, defining the plurality of specific sectors conforming to the sector amount by starting from the predetermined sector of the FAT, filling the cluster entry values related to the fill-file into the plurality of specific sectors, and transmitting the FAT to the host system after setting the logical addresses corresponding to the plurality of specific sectors to the write-protect status; and when the host system is about to read the root directory, filling the fill-file header of the fill-file into the predetermined sector of the root directory, and transmitting the root directory to the host system after setting the logical address corresponding to the predetermined sector of the root directory to the write-protect status.

17. A memory controller, for managing a plurality of physical blocks of a memory chip in a memory storage device, the memory controller comprising:

a host interface, for coupling to a host system;

a memory interface, for coupling to the memory chip; and a memory management circuit, coupled to the host interface and the memory interface, wherein the memory management circuit groups the plurality of physical blocks into at least a data area, a spare area, and a system area, configures a plurality of logical addresses, and groups the plurality of logical addresses into a plurality of logical blocks to be mapped to the physical blocks in the data area, when the host system is powered on, if the plurality of logical addresses have been formatted into at least one partition by using a file system and said at least one partition comprises a PBR, a FAT, and a root directory, the memory management circuit further reads the PBR and the root directory to determine whether a fill-file of a predetermined file capacity exists in the memory chip, if the fill-file does not exist, when the host system is about to read the FAT, the memory management circuit configures a sector amount corresponding to the predetermined file capacity, defines a plurality of specific sectors conforming to the sector amount by starting from a predetermined sector of the FAT, fills a plurality of cluster entry values related to the fill-file into the plurality of specific sectors, and transmits the FAT to the host system after setting the logical addresses corresponding to the plurality of specific sectors to a write-protect status, and when the host system is about to read the root directory, the memory management circuit fills a fill-file header of the fill-file into the predetermined sector of the root directory and transmits the root directory to the host system after setting the logical address corresponding to the predetermined sector of the root directory to the write-protect status.

18. A memory storage device, comprising:

a memory chip, having a plurality of physical blocks;

a connector, for coupling to a host system; and a memory controller, coupled to the memory chip and the connector, for grouping the plurality of physical blocks into at least a data area, a spare area, and a system area, configuring a plurality of logical addresses, and grouping the plurality of logical addresses into a plurality of logical blocks to be mapped to the physical blocks in the data area, wherein when the host system is powered on, if the plurality of logical addresses have been formatted into at least one partition by using a file system and said at least one partition comprises a PBR, a FAT, and a root directory, the memory controller reads the PBR and the root directory to determine whether a fill-file of a predetermined file capacity exists in the memory chip, if the fill-file does not exists, when the host system is about to read the FAT, the memory controller configures a sector amount corresponding to the predetermined file capacity, defines a plurality of specific sectors conforming to the sector amount by starting from a predetermined sector of the FAT, fills a plurality of cluster entry values related to the fill-file into the plurality of specific sectors, and transmits the FAT to the host system after setting the logical addresses corresponding to the plurality of specific sectors to a write-protect status, and when the host system is about to read the root directory, the memory controller fills a fill-file header of the fill-file into the predetermined sector of the root directory and transmits the root directory to the host system after setting the logical address corresponding to the predetermined sector of the root directory to the write-protect status.

19. The memory storage device according to claim 18, wherein the PBR has a free space field, if the memory controller determines that the fill-file does not exist, when the host system is about to read the PBR, the memory controller further writes a difference between a total capacity of the memory chip and the predetermined file capacity into the free space field and transmits the PBR to the host system.

20. The memory storage device according to claim 18, wherein the predetermined sector of the FAT is used for storing the cluster entry values of a first quantity, and other sectors of the FAT are respectively used for storing the cluster entry values of a second quantity, and the memory controller further configures a cluster amount for storing the fill-file according to the predetermined file capacity and configures the sector amount according to the cluster amount, the first quantity, and the second quantity.

21. A memory storage device, comprising:
a memory chip, having a plurality of physical blocks;
a connector, for coupling to a host system; and
a memory controller, coupled to the memory chip and the connector, for managing the plurality of physical blocks of the memory chip, wherein the memory controller groups the plurality of physical blocks into at least a data area, a spare area, and a system area, configures a plurality of logical addresses, and groups the plurality of logical addresses into a plurality of logical blocks to be mapped to the physical blocks in the data area,
when the host system is powered on, the memory controller configures a corresponding data of a fill-file of a predetermined file capacity to a file system stored in the memory chip and transmits a FAT of the file system to the host system after setting the fill-file to a write-protect status, wherein the fill-file is used for occupying a cache space of the host system so that the host system reads a desired data from the memory chip.

* * * * *